Figure 1:
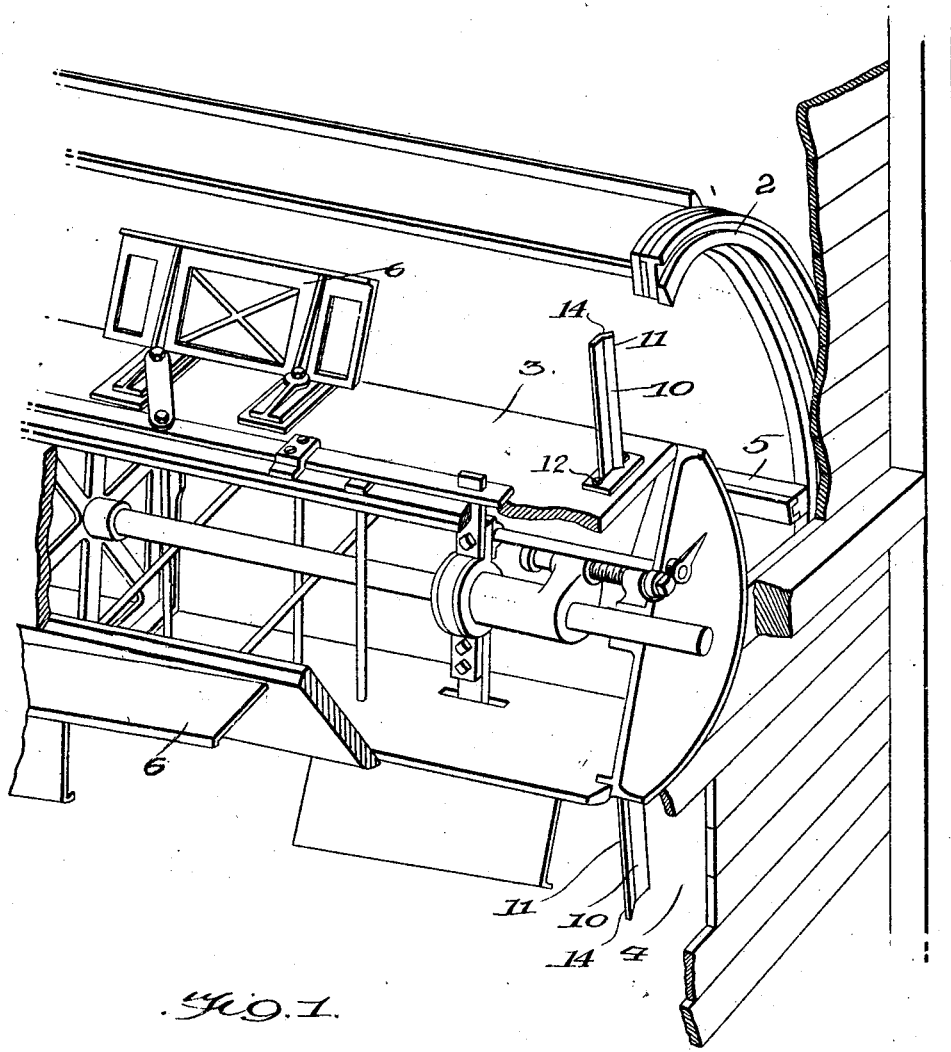

Aug. 27, 1929.   F. P. RYDER   1,725,938
BEATER CYLINDER FOR GREEN PEA VINERS
Filed Aug. 23, 1927   2 Sheets-Sheet 1

Inventor
Frank Pettis Ryder
By
Attorney

Aug. 27, 1929. F. P. RYDER 1,725,938
BEATER CYLINDER FOR GREEN PEA VINERS
Filed Aug. 23, 1927   2 Sheets-Sheet 2

Inventor
Frank Pittis Ryder
By
Attorney

Patented Aug. 27, 1929.

1,725,938

UNITED STATES PATENT OFFICE.

FRANK PETTES RYDER, OF NIAGARA FALLS, NEW YORK.

BEATER CYLINDER FOR GREEN-PEA VINERS.

Application filed August 23, 1927. Serial No. 214,903.

My invention relates to green pea viners of the type in which an outer cylinder or reel provided interiorly with longitudinal lifting ribs raises pea vines fed into one end of the machine to the upper half of the cylinder whence they drop into the path of beaters carried by an inner rapidly rotating cylinder so that the beaters striking the vines in mid-air cause the pea pods to open and release the peas contained in them. In all of the green pea viners of this type in use the only beaters carried by the viner or beater cylinder are broad paddle like beaters of relatively great length longitudinally of the cylinders, usually inclined at a slight angle to the axis of the beater cylinder which may be or may not be varied in use, and as the vines drop from the lifting ribs of the outer cylinder they are struck by the outer end edges of the flat blade and not by the side edges. While the impact of the flat of the beater arm or blade is essential to the successful operation of a green pea viner, I have found that the action of the viner is facilitated by providing the beater cylinder with additional beater arms near the feed end of the machine arranged to strike the vines not with the flat of a blade but with its edge, and my invention consists in providing the beater cylinder with such additional beater arms to work in cooperation with the beaters of the usual type.

Referring to the drawings:—

Figure 1 is a perspective view of the feed end of a green pea viner equipped with my invention, the casing and the inner and outer cylinders being partly broken away.

Figure 2:
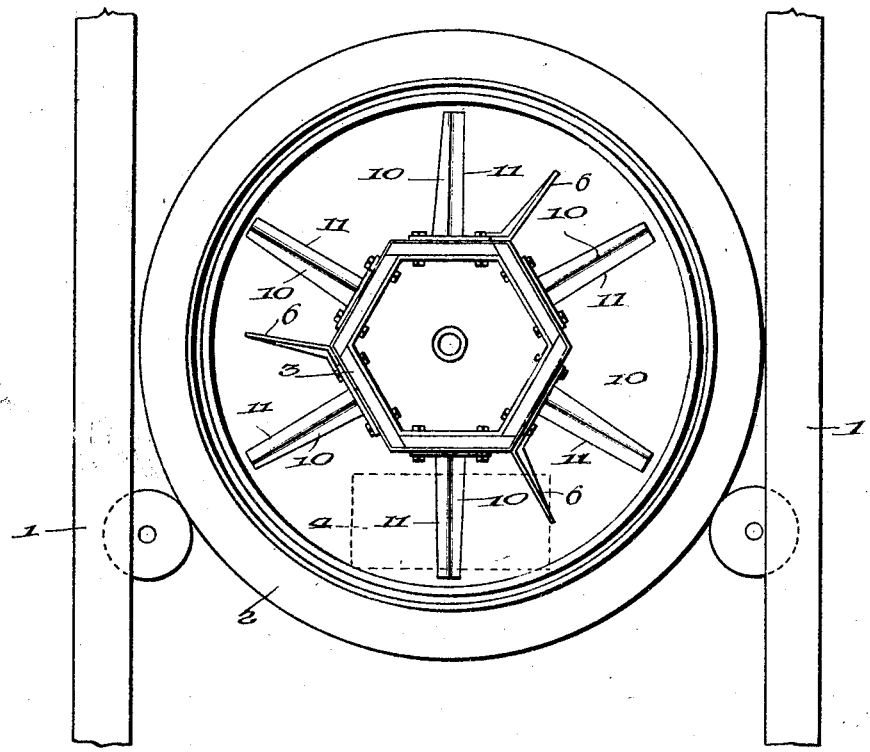
Figure 4:
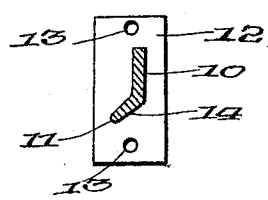
Figure 3:
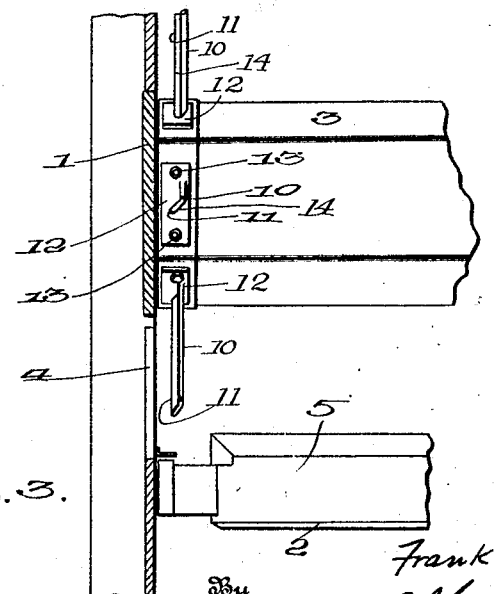

Figure 2 is an end view of the inner and outer cylinders shown in Figure 1.
Figure 3 is a side view of the feed ends of the inner and outer cylinders shown in Figure 2, and Figure 4 is a cross sectional view of the auxiliary beater arms.
In the drawings 1 indicates the enclosing casing for the outer or lifting cylinder or reel 2, and the inner or beater cylinder 3 of a green pea viner as shown in Letters Patent of the United States No. 1,219,416, issued to me March 13, 1917, it being understood that these parts 2 and 3, while generally referred to as cylinders, are usually constructed as prisms usually hexagonal in cross section.

The end wall of the casing 1 is provided with a feed opening 4 below the axis of the beater cylinder through which the pea vines are fed to the space between the outer periphery of the beater cylinder and the inner periphery of the outer cylinder in position to be engaged by the longitudinally arranged lifting ribs 5 on the inner periphery of the outer cylinder 2 and lifted to above the level of the axis of the beater cylinder and allowed to drop into the path of movement of the beaters 6 carried on the periphery of the beater cylinder 3. These beaters 6 while here shown as adjustable with reference to their angle of inclination to the axis of the beater cylinder by mechanism shown and described in my patent No. 1,219,- 416, above referred to, are characterized by relatively great length longitudinally of the beater cylinder though at a slight angle to its axis, so as to strike the vines dropping into their path of movement from the lifting ribs with the outer edge of the flat or face of the beater, not with the side edge.

It is essential to the operation of green pea viners that the vines penetrate the path of the beaters to such a distance that there will be sufficient contact with the face of the beater to open the pea pods. The distance to which the vines will penetrate the path of the beaters is determined by two independent factors—first the velocity at which the vines move into the path of the beaters, and second, the time interval between the instant at which the vines enter the path of movement of the beaters and the instant at which the beater edge strikes them.

The vines fall from a lifting rib 5 of the outer cylinder or reel 2 shortly before it reaches the limit of its upward movement, say at the eleven o'clock position, the twelve o'clock position being the highest position, and acquire a vertical velocity of drop due to the influence of gravity. The vines start to drop from a condition of practical rest, as the outer edges of the beaters are close to the inner edges of the lifting ribs and their velocity as they penetrate the path of the beaters is practically that derived from the formula for freely falling bodies—$S = 1/2 AT^2$. In practice successive beater edges pass the point at which the vines enter their path at approximately the rate of six hundred a minute or at intervals of 1/10th second. This is exactly true where successive beaters are spaced 120 degrees apart and the beater cylinder is rotated 200 R. P. M. Maximum penetration of the path of movement of the beaters occurs when the vine mass enters this path just as a beater has passed, and thus has 1/10th of a second in which to drop before it is struck by the next succeeding beater. In this 1/10th second it will penetrate 1 1/2 inch. The average time of drop in the interval between successive beaters is 1/20th of a second and the average penetration is 3/8ths of an inch. As a penetration of less than 3/8 inch average results in inefficient threshing, the time interval between successive beaters must not be less than 1/10th second, and the number of blows that can be struck by the beaters of a beater cylinder of a given length is limited by this factor.

By providing the beater cylinder near the feed end of the machine with arms 10 extending from the cylinder in substantially radial direction and so arranged that their side or radial edges 11 will strike the vine mass as it enters through the feed opening 4, the number of thrashing blows to which the vine mass may be subjected is greatly increased. The vines entering through the feed opening 4 are pushed into the viner at a constant rate of about 100 feet per minute. These radial arms 10 when spaced 60 degrees apart and carried on a beater cylinder driven 200 R. P. M. pass the feed opening at a rate of 1200 per minute or at intervals of 1/20 second. Since the vines are advanced into the path of these radial arms at a constant velocity of 100 feet per minute the maximum of penetration of the vines into the path of movement of these arms is 1 inch and the average 1/2 inch. These radial arms as they pass before the feed opening are therefore effective in opening pods at twice the rate possible in case of beaters mounted to strike the vines as they drop from the lifting ribs.

Each of the arms 10 is secured to or preferably formed integral with a base 12 adapted to be secured by bolts 13 to the strips forming the faces of the hexagonal prism of the cylinder. The arm is preferably of the form in cross section shown in Figure 4 with its body portion in a plane at right angles to the axis of the beater cylinder and with its striking edge 11 bent over towards the feed opening 4 so that the inclined face 14 will tend to force the vines away from the feed opening and toward the beaters 6.

While the arms 10 are shown as extending radially from the beater cylinder their striking edges 11 may be at more or less of an angle to the radius and while these arms are preferably nearly long enough to reach the inner face of the outer cylinder 2, I do not desire to be limited to any particular length or to any particular form in cross section, provided only that these arms are adapted to strike the vines with their outwardly extending radial or nearly radial edges as the vines are pushed into their path of movement by the feeder.

Having thus described my invention, what I claim is:

1. In a green pea viner the combination of an outer cylinder provided with means for lifting vines, a casing enclosing the outer cylinder having a feed opening at one end, a beater cylinder within the lifting cylinder provided with longitudinally extending beaters constructed and arranged to strike the vines dropping from the lifting cylinder with the outer edges of their blades, and auxiliary beater arms carried by the beater cylinder near the feed end thereof extending therefrom in a radial direction so constructed and arranged that they strike the vines with their radially extending relatively thin side edges.

2. In a green pea viner the combination of an outer cylinder provided with means for lifting vines, a casing enclosing the outer cylinder having a feed opening at one end, a beater cylinder within the lifting cylinder provided with longitudinally extending beaters constructed and arranged to strike the vines dropping from the lifting cylinder with the outer edges of their blades, and auxiliary beater arms carried by the beater cylinder near the feed end thereof extending therefrom in a radial direction so constructed and arranged that they strike the vines with their radially extending relatively thin side edges, said auxiliary beater arms being provided on the side towards the delivery end of the viner with inclined faces adapted to act upon the vines to force them toward the delivery end.

3. In a green pea viner the combination of an outer cylinder provided with means for lifting vines, a casing enclosing the outer cylinder having a feed opening at one end, a beater cylinder within the lifting cylinder provided with longitudinally extending beaters constructed and arranged to strike the vines dropping from the lifting cylinder with the outer edges of the blades, and auxiliary beater arms carried by the beater cylinder near the feed opening extending from the beater cylinder in a radial direction so constructed and arranged that they strike the vines with their radially extending relatively thin side edges.

4. In a green pea viner the combination of an outer cylinder provided with means for lifting vines, a casing enclosing the outer cylinder having a feed opening at one end, a beater cylinder within the lifting cylinder provided with longitudinally extending beaters constructed and arranged to follow one after another in the same plane transverse to the axis of the beater cylinder arranged to strike the vines dropping from the lifting cylinder with the outer edges of flat blades, and auxiliary beater arms carried by the beater cylinder near the feed end thereof extending therefrom in a radial direction so constructed and arranged that they strike the vines with their radially extending relatively thin side edges, the longitudinally extending beaters which follow one after another in the same plane transverse to the axis of the cylinder being spaced apart a relatively great distance and the auxiliary beater arms being spaced apart a relatively small distance.

5. In a green pea viner the combination of an outer cylinder provided with means for lifting vines, a casing enclosing the outer cylinder having a feed opening at one end, a beater cylinder within the lifting cylinder provided with longitudinally extending beaters arranged to follow one after another in the same plane transverse to the axis of the beater cylinder constructed and arranged to strike the vines dropping from the lifting cylinder with the outer edges of flat blades, and auxiliary beater arms carried by the beater cylinder near the feed end thereof extending therefrom in a radial direction so constructed and arranged that they strike the vines with their radially extending relatively thin side edges, the longitudinally extending beaters which follow one after another in the same plane transverse to the axis of the cylinder being so spaced apart as to strike the vines dropping from the lifting cylinder at predetermined intervals, and the auxiliary beater arms being so spaced apart as to strike the vines at less intervals.

6. For use in a green pea viner, a beater cylinder having in combination beaters extending in a direction lengthwise of the beater cylinder constructed and arranged to strike with their longitudinally extending outer sides and beater arms extending radially from the beater cylinder constructed and arranged to strike with their radially extending side edges.

7. For use in a green pea viner, a beater cylinder having in combination beaters of relatively great extent lengthwise of the beater cylinder constructed and arranged to strike the vines with their flat outer sides and beater arms at the feed end of the beater cylinders of relatively slight extent lengthwise of the beater cylinder constructed and arranged to strike the vines with their outwardly extending side edges.

In testimony whereof, I hereunto affix my signature.

FRANK PETTES RYDER.

CERTIFICATE OF CORRECTION.

Patent No. 1,725,938.                            Granted August 27, 1929.

It is hereby certified that the middle name of the patentee in the above numbered patent was erroneously written and printed as "Pettes" whereas said middle name should have been written and printed as "Pittis"; and that the said Letters Patent should be read with this correction therein that the same may conform to the record of the case in the Patent Office.

Signed and sealed this 28th day of January, A. D. 1930.

(Seal)                                                 M. J. Moore,
Acting Commissioner of Patents.